P. B. BOSWORTH.
RIM FOR WHEELS.
APPLICATION FILED AUG. 27, 1913.
1,108,546.
Patented Aug. 25, 1914.
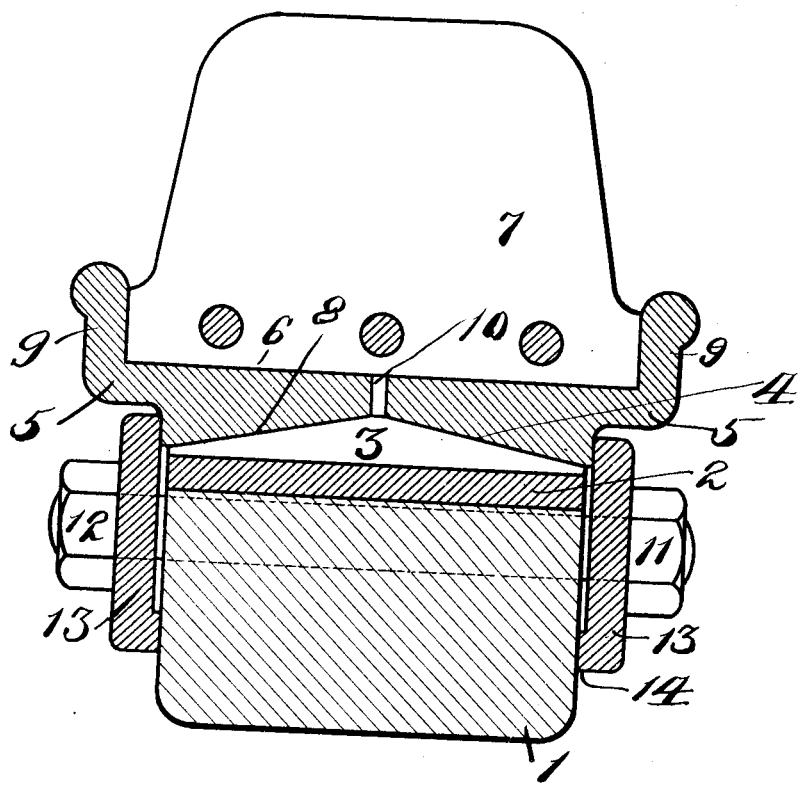
Witnesses
Ant. M. Oliver
G. L. McClintock
Inventor
Percy B. Bosworth
By C. E. Humphrey
Attorney

UNITED STATES PATENT OFFICE.

PERCY B. BOSWORTH, OF AKRON, OHIO.

RIM FOR WHEELS.

1,108,546.  Specification of Letters Patent.  Patented Aug. 25, 1914.

Application filed August 27, 1913. Serial No. 786,875.

*To all whom it may concern:*

Be it known that I, PERCY B. BOSWORTH, a citizen of the United States, residing at Akron, in the county of Summit and State of Ohio, have invented new and useful Improvements in Rims for Wheels, of which the following is a specification.

This invention relates to improvements in vehicle wheels, more especially to the rim portion thereof, and the object of the invention is to provide means for holding a tire-carrying rim detachably in position on the peripheral portion of a vehicle wheel, the means for clamping the tire-carrying rim on the vehicle wheel embodying means for laterally compressing or distorting the base portion of an elastic tire seated on the tire-carrying rim so that the operation of securing the tire-carrying rim in position simultaneously effects a compression or distortion of the base portion of the tire, thereby effecting in one operation two results which have been heretofore accomplished by two independent operations, it being well known that the life and usefulness of an elastic tire is greatly enhanced by compressing or distorting the base of the rim-engaging portion thereof.

With the foregoing and other objects in view, the invention consists in the novel construction, combination and arrangements of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claims hereinafter appended.

The drawing presented is a transverse sectional view of the rim portion of a vehicle wheel embodying this invention, also showing a tire mounted thereon and the tire-holding means in operative relation with respect thereto.

Referring to the drawings in detail the reference numeral 1 indicates the felly of an ordinary vehicle wheel on which is mounted a peripheral felly-band 2. Extending circumferentially and seated on the outer face of the felly band 2 is a broken annulus 3 approximately triangular in cross section, with a wide base approximating in width substantially the width of the felly-band 2 and with a relatively narrow median portion from which the outer face of the band inclines in both directions to the side edges thereof, and with the angles between the base and the faces 4 thereof forming an abrupt and an acute angle.

Adapted to be mounted on the faces 4 of the broken annulus 3 are a pair of tire-holding members 5 each provided with an outer face 6 constituting when positioned a seat for a tire 7 and each also provided with an inclined inner face 8 adapted to engage one of the outer or inclined faces 4 of the broken annulus 3. The lateral portions of the members 5 are provided with outwardly-extending tire-engaging flanges 9 of a preferred type, that is to say, if the tire to be engaged is provided with what is known as a straight side, the flanges are shaped accordingly as shown, and if the lateral faces of the tire 7 are provided with lateral beads, the flanges 9 will be fashioned in the form of the conventional clencher flanges to accommodate themselves to the curved surfaces of the tire.

The members 5 are so arranged that when seated and with their inner inclined faces 8 engaging the outer faces 4 of the broken annulus 3 the inner or opposing edges of the members will be slightly separated to provide a space 10. The wheel is provided at intervals with suitable transverse apertures in which are mounted bolts 11 provided with nuts 12. In order to force the members 5 toward each other there is provided on each of the lateral faces of the wheel a circumferentially-extending clamping band 13 the outer portion of each ring being adapted to engage the side face of its respective tire-holding band 5 and with its inner portion provided with a circumferential ridge 14 designed to engage one side of the wheel. The circumferential rings 13 are provided with a series of apertures arranged to be positioned in registering relation with respect to the apertures in the wheel which receive the bolts 11 so that the bolts 11 may be passed through these three registering apertures and as the nuts 12 are drawn up the bands 3 are drawn toward each other and as their inner portions 14 engage the wheel their outer portions engaging the members 5 will force the latter toward each other and as the members 5 are annular and their inner faces 8 engage the faces of the broken annulus 3 the latter is first of all constricted on its seat on the felly band and the wedging action set up by the lateral movements of the rim-forming members 5 toward each other tends to tighten them in position and prevent circumferential movement thereof. At the same time, the lateral movements of the members 5 toward each other cause the flanges 9 thereof to compress or distort the base portion of the tire which is seated on the outer face of these members, so that a duplex result is effected; that is to say, the rim-forming members 5 by being forced toward each other are clamped onto the member 3 which in turn is compressed or contracted onto the felly band, thereby effectually locking the rim-forming members 5 from movement and the much-desired compression or distortion of the base of the tire is effected.

I claim:—

1. A vehicle wheel provided on the peripheral portion thereof with a circumferentially-extending broken annulus approximately triangular in cross-section, a pair of annularly-formed tire-holding members seated on the inclined faces of said annulus, the inner faces of said tire-holding members fashioned to engage and coöperate with the inclined faces of said broken annulus and with outwardly-extending portions adapted to engage the base portion of a tire whereby when said tire-holding members are forced toward each other said broken annulus is clamped on said wheel, said tire-holding members are clamped on said annulus against movement and the base portion of the tire is compressed or distorted.

2. A vehicle wheel provided on the peripheral portion thereof with a circumferentially - extending, laterally - removable, broken annulus, approximately triangular in cross-section, a pair of endless tire-holding bands having their inner faces inclined to coöperate with the outer faces of said annulus and with their outer portions fashioned to engage the base portion of a solid tire, means having connection with the wheel adapted to force said tire-holding bands toward each other to thereby simultaneously contract said annulus on said wheel, hold said tire-holding bands removably on said wheel and simultaneously compress or distort the base portion of a tire.

3. A vehicle wheel provided on the peripheral portion thereof with a circumferentially - extending, laterally - detachable, broken annulus, approximately triangular in cross-section, a pair of tire-holding bands having their inner faces fashioned to coöperate with the outer faces of said annulus and with the outer portions thereof adapted to engage the base portion of a solid tire, a pair of annular rings arranged along the side faces of said wheel and constituting means for shifting said tire-holding bands toward each other to thereby cause a contraction of said annulus, a temporary locking of said tire-holding bands in position, and a simultaneous compression or distortion of the base portion of the tire.

4. A vehicle wheel provided on the peripheral portion thereof with a circumferentially - extending, laterally - detachable, broken annulus approximately triangular in cross section with the inclined portions thereof extending toward each other, a pair of annularly-formed tire-holding bands arranged to be seated on said annulus and coöperate therewith and with the outwardly-extending portion thereof fashioned to engage the base portion of a solid tire, and means to shift said tire-holding bands toward each other, thereby clamping said bands on said annulus, contracting said annulus and simultaneously compressing or distorting the base portion of the tire.

In testimony whereof I have hereunto set my hand in presence of two subscribing witnesses.

PERCY B. BOSWORTH.

Witnesses:
 C. E. HUMPHREY,
 A. L. MCCLINTOCK.